US006807241B1

(12) United States Patent
Milbar et al.

(10) Patent No.: US 6,807,241 B1
(45) Date of Patent: Oct. 19, 2004

(54) METHOD AND APPARATUS FOR PARTIAL AND COURSE FREQUENCY OFFSET ESTIMATION IN A DIGITAL AUDIO BROADCASTING (DAB) SYSTEM

(75) Inventors: Marek Milbar, Philadelphia, PA (US); Mohammad Hossein Zarrabizadeh, Woodbridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,058

(22) Filed: Sep. 15, 1999

(51) Int. Cl.[7] .............................. H03D 1/00; H04L 27/06
(52) U.S. Cl. ...................... 375/343; 375/142; 375/143; 375/150
(58) Field of Search ................................. 375/369, 208, 375/260, 130–152, 316–352; 370/343, 310, 320; 340/870.28; 342/357.12; 455/139

(56) References Cited

U.S. PATENT DOCUMENTS

| | | | | |
|---|---|---|---|---|
| 5,696,762 A | * | 12/1997 | Natali et al. | ................. 370/320 |
| 5,960,028 A | * | 9/1999 | Okamoto et al. | ........... 375/130 |
| 5,970,397 A | * | 10/1999 | Klank et al. | ................. 455/139 |
| 6,208,695 B1 | * | 3/2001 | Klank et al. | ................. 375/260 |

* cited by examiner

*Primary Examiner*—Stephen Chin
*Assistant Examiner*—Curtis Odom (57) ABSTRACT

A method and apparatus are disclosed for frequency offset estimation in a hybrid in-band on-channel (HIBOC) digital audio broadcasting (DAB) system. The frequency offset estimation algorithm first determines the coarse frequency offset, in terms of integer number of OFDM bin separations between an actual and measured location of a correlated peak, followed by estimation and tracking of the partial (residual) offset in a continuous fashion. A frame is correlated at a first frequency, and then the frequency is shifted by a predefined amount, such as half of the inter-bin frequency amount, $\Delta f$, before correlating again. The measurement with the highest peak of the plurality of frequency values is utilized to obtain the course frequency offset estimate. The partial frequency offset estimation algorithm utilizes phase information contained in reference frequency points in the frequency domain. The phase rotation of the reference vector is proportional to the frequency error, and the frequency error is extracted and filtered in the time domain. The initial partial frequency offset estimation is corrected and used for continuous frequency tracking. Following the course frequency offset estimation, the unmodulated pilot bins (and all other bins), are within at least half the of the OFDM bin separation. In the presence of a frequency offset, the complex bins start rotating. The rate of the rotation is a function of the extent of the partial frequency offset. The change in phase from one frame to the next is proportional to the rate of rotation, and the sign of the rotation indicates the direction of the shift.

26 Claims, 4 Drawing Sheets

METHOD AND APPARATUS FOR PARTIAL AND COURSE FREQUENCY OFFSET ESTIMATION IN A DIGITAL AUDIO BROADCASTING (DAB) SYSTEM

CROSS REFERENCE TO RELATED APPLICATIONS

The present invention is related to U.S. patent application Ser. No. 09/396,055 entitled "Method And Apparatus For Frequency Offset Estimation And Interleaver Synchronization Using Periodic Signature Sequences," filed contemporaneously herewith, assigned to the assignee of the present invention and incorporated by reference herein.

FIELD OF THE INVENTION

The present invention relates generally to digital audio broadcasting (DAB) and other types of digital communication systems, and more particularly, to frequency offset estimation techniques for such digital audio broadcasting (DAB) and other types of digital communication systems.

BACKGROUND OF THE INVENTION

Proposed systems for providing digital audio broadcasting (DAB) in the FM radio band are expected to provide near CD-quality audio, data services and more robust coverage than existing analog FM transmissions. However, until such time as a transition to all-digital DAB can be achieved, many broadcasters require an intermediate solution in which the analog and digital signals can be transmitted simultaneously within the same licensed band. Such systems are typically referred to as hybrid in-band on-channel (HIBOC) DAB systems, and are being developed for both the FM and AM radio bands.

In order to prevent significant distortion in conventional analog FM receivers, the digital signal in a typical FM HIBOC DAB system is, for example, transmitted in two side bands, one on either side of the analog FM host signal, using orthogonal frequency division multiplexing (OFDM) sub-carriers. In an OFDM communication system, the digital signal is modulated to a plurality of small sub-carrier frequencies that are then transmitted in parallel.

In the United States, the frequency plan established by current FCC regulations separates each transmitting station in a geographical area by 800 KHz. Any transmitting stations in adjacent geographical areas, however, are separated from a local transmitting station by only 200 KHz. Thus, a particularly significant source of interference in such a system is known as first adjacent analog FM interference. This interference results when a portion of an FM host carrier in an adjacent geographic area overlaps in frequency with a portion of a digital signal side band. Although first adjacent analog FM interference, when present, typically affects only one of the two digital side bands, it nonetheless represents a limiting factor on the performance of DAB systems. The presence of a strong first adjacent interference signal will significantly degrade the performance of the digital signal transmissions, even when one of the two side bands is free from interference.

Frequency offset estimation techniques are implemented in most communication systems. In most digital communication systems, a frequency error is calculated using information in the time domain, and feedback or forward error correction is provided to correct the error. Time domain operation in the IBOC case, however, is significantly impacted by in-band power from adjacent channels due to first adjacent interference. In addition, timing errors in the time domain operation are coupled to the frequency error calculation.

Most conventional frequency offset estimation algorithms estimate the coarse frequency offset in the frequency domain after initially performing a partial frequency offset estimation and compensation in the time domain. Generally, the partial frequency offset estimation is performed by estimating the phase rotation of the cyclic prefix portion of the OFDM frame in the time domain. Thereafter, the corresponding partial frequency offset is readily extracted from the estimated phase rotation. For a more detailed discussion of conventional frequency offset estimation algorithms, see, for example, J. Van de Beek, "Time and Frequency Offset Estimation in OFDM Systems Employing Pulse Shaping," I.E.E.E. ICUPC Conference (April, 1997), incorporated by reference herein.

A need therefore exists for a frequency offset estimation technique that provides reliable performance, even in presence of first adjacent interference. A further need exists for a method and apparatus that independently performs frequency offset estimation and frame synchronization in the frequency domain.

SUMMARY OF THE INVENTION

Generally, a method and apparatus are disclosed for frequency offset estimation in a hybrid in-band on-channel (HIBOC) digital audio broadcasting (DAB) system. The frequency offset estimation algorithm first determines the coarse frequency offset, in terms of integer number of OFDM bin separations between an actual and measured location of a correlated peak, followed by estimation and tracking of the partial (residual) offset in a continuous fashion.

Since the coarse frequency offset estimation is performed before the partial frequency offset estimation is established, the coarse frequency offset can be an arbitrary number. If the frequency offset happens to be close to a bin, the correlated output will provide a relatively clean peak. If, however, the frequency offset is in the middle of two bins, the correlated output will provide the worst-case peak. According to one feature of the present invention, a frame is correlated at a first frequency, and then the frequency is shifted by a predefined amount, such as half of the inter-bin frequency amount, $\Delta f$, before correlating again. The measurement with the highest peak of the plurality of frequency values is utilized. Since the correlation is performed for at least two frequencies, with a relative offset of half of the inter-bin frequency amount, $\Delta f$, at least one frequency will position the correlated peak near a bin.

The coarse frequency offset estimation algorithm utilizes signature sequences, such as Barker codes, to provide reference information contained in discrete known frequency points in the frequency domain, among the sub-carriers in an OFDM system. Correlation is applied in the frequency domain to identify peaks in the transmitted signal and determine the required coarse frequency offset adjustment. The calculated coarse frequency offset is applied to a forward correction mechanism and the coarse offset, in terms of an integer number of OFDM sub-carriers, is corrected.

To estimate and compensate for the partial frequency offset in the range of $+f_{fr}/2$ and $-f_{fr}/2$ (where $f_{fr}$ denotes the OFDM bin separation), the coarse frequency offset and compensation must have been already completed. The partial frequency offset estimation algorithm utilizes phase information contained in reference frequency points in the frequency domain. The phase rotation of the reference vector is proportional to the frequency error, and the frequency error is extracted and filtered in the time domain. The initial partial frequency offset estimation is corrected and used for continuous frequency tracking. The calculated partial frequency offset is applied to a forward correction mechanism and the partial offset, in terms of an amount less than the sub-carrier spacing, is corrected.

The inner-most bins of each upper and lower side band in an OFDM system are unmodulated. Following the course frequency offset estimation, the unmodulated bins, and all bins, are within at least half the of the OFDM bin separation. The unmodulated bins can be used to estimate the partial fraction of the frequency offset. In the presence of a frequency offset, the complex bins start rotating. The rate of the rotation is a function of the extent of the frequency offset. The partial frequency offset estimation algorithm attempts to make the rate of rotation equal to zero. The change in phase from one frame to the next is proportional to the rate of rotation, and the sign of the rotation indicates the direction of the shift.

A more complete understanding of the present invention, as well as further features and advantages of the present invention, will be obtained by reference to the following detailed description and drawings.

DETAILED DESCRIPTION

The present invention provides a method and apparatus for estimating the frequency offset in an FM HIBOC DAB system. The frequency offset estimation algorithm first determines the coarse frequency offset, in terms of integer number of OFDM bin separations between an actual and measured location of a correlated peak, followed by estimation and tracking of the partial offset in a continuous fashion. A periodic signature sequence, such as a Barker code with a very low side-lobe, is transmitted over certain number of bins in a DAB system in both the upper and lower sides of the DAB signal. Once the codes are assigned to specific bins known to the receiver, any shift from that location due to frequency offset errors can be estimated and compensated for by the frequency offset algorithm, using conventional feedback or forward error correction techniques.

As discussed further below, the coarse frequency offset estimation algorithm utilizes signature sequences, such as Barker codes, to provide reference information contained in discrete known frequency points in the frequency domain, among the sub-carriers in an OFDM system. Correlation is applied in the frequency domain to identify peaks in the transmitted signal and determine the required coarse frequency offset adjustment. The calculated coarse frequency offset is applied to a forward correction mechanism and the coarse offset, in terms of an integer number of OFDM sub-carriers, is corrected.

Since the coarse frequency offset estimation is performed before the partial frequency offset estimation is established, the frequency offset can be an arbitrary number. If the frequency offset happens to be close to a bin, the correlated output will provide a relatively clean peak. If, however, the frequency offset is between two bins, the correlated output will provide the worst-case peak. Thus, the coarse frequency offset estimation of the present invention utilizes a signature sequence with every OFDM frame, to provide dedicated bins in each frame. A frame is correlated, and then the frequency is shifted by a predefined amount, such as half of the inter-bin frequency amount, $\Delta f$, before correlating again. The measurement with the highest peak of the two frequency values is utilized. Thus, since the correlation is performed for two frequencies, with a relative offset of half of the inter-bin frequency amount, $\Delta f$, at least one frequency will position the correlated peak near a bin.

As discussed further below, the partial frequency offset estimation algorithm utilizes phase information contained in reference frequency points in the frequency domain. The phase rotation of the reference vector is proportional to the frequency error, and the frequency error is extracted and filtered in the frequency domain (after the FFT block 620, shown in FIG. 6 and discussed below). The initial partial frequency offset estimation is corrected and used for continuous frequency tracking. The calculated partial frequency offset is applied to a forward correction mechanism and the partial offset, in terms of an amount less than the sub-carrier spacing, is corrected.

Figure 1:
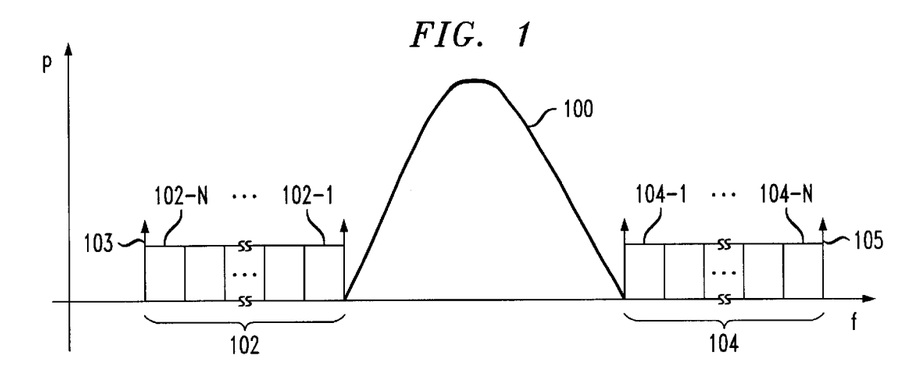
FIG. 1 shows a portion of a frequency spectrum in an exemplary hybrid in-band on-channel (HIBOC) digital audio broadcasting (DAB) system in accordance with the present invention.

FIG. 1 illustrates a portion of a frequency spectrum in an exemplary FM HIBOC DAB system, plotted with the power, P, as a function of frequency, f. The portion of the spectrum shown in FIG. 1 includes an analog host FM signal 100 with associated lower digital side band 102 and upper digital side band 104. The side bands represent portions of the frequency spectrum used to transmit digital audio information in the HIBOC DAB system.

The system in the illustrative embodiment, discussed further below, uses an outer cyclic redundancy code (CRC), and differential quadrature phase shift keyed (DQPSK)/OFDM modulation. The DQPSK modulation of transmitted symbols provides robustness to frequency-selective fading and oscillator phase drift. The differential encoding is performed in frequency between OFDM tones. The digital signal to be transmitted and the outer CRC block code can be repeated in each of the side bands 102, 104. It is noted, however, that the encoded streams on both sides are not necessarily equivalent. As shown in FIG. 1, each of the side bands include N components, 102-1 through 102-N, and 104-1 through 104-N, respectively. The components may represent, for example, sets of orthogonal frequency division multiplexed (OFDM) sub-carriers. Pilot tones 103 are present at either end of the side band 102, and pilot tones 105 are present at either end of the side band 104. Additional pilot tones (not shown) may be present elsewhere in the portion of the frequency spectrum shown. The pilot tones 103, 105 correspond to selected OFDM reference tones, and may be used to determine the presence of interference. While the unmodulated pilot tones 103, 105 could be placed anywhere across the DAB spectrum, the main advantage of positioning them on the side is to utilize them as reference points in the DQPSK de-modulation across the frequency domain.

Figure 2:
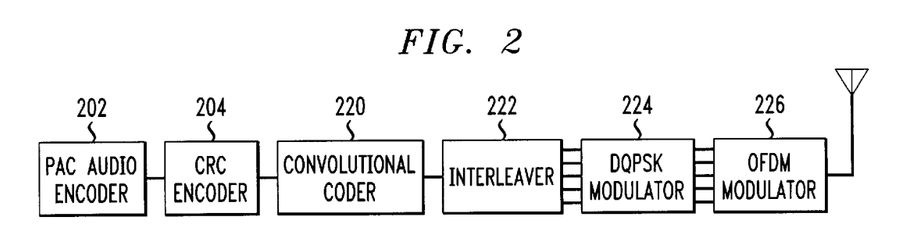
FIG. 2 is a schematic block diagram of a transmitter in an exemplary hybrid in-band on-channel (HIBOC) digital audio broadcasting (DAB) system in which the present invention may be implemented.

FIG. 2 shows a transmitter 200 of an exemplary FM HIBOC DAB system in which the invention may be implemented. It should be noted that FIG. 2 shows only the digital portion of the transmitter 200, i.e., the portions associated with generation and processing of the digital signals. Additional conventional processing elements may be used to process the analog signals. A PAC audio coder 202 generates an encoded audio signal, for example, at a bit rate of 96 kbps using the audio compression techniques described, for example, in D. Sinha, J.D. Johnston, S. Dorward and S.R. Quackenbush, "The Perceptual Audio Coder," in Digital Audio, Section 42, pp. 42-1 to 42-18, CRC Press, 1998, incorporated by reference herein. The encoded audio bit stream is applied to a CRC encoder 204, which generates CRC bits in a conventional manner using a CRC error detecting block code. CRC is an example of one type of "inner code" that may be used in the system 200. Other possible inner codes include, for example, Reed-Solomon (RS) codes, Bose-Chadhuri-Hocquenghem (BCH) codes, and other block codes.

As shown in FIG. 2, the FM HIBOC DAB transmitter 200 also includes a convolutional coder 220, such as a complementary punctured pair convolutional (CPPC) coder for coding the audio bitstream in accordance with well-known CPPC techniques. In addition, the FM HIBOC DAB system 200 includes an interleaver 222, a DQPSK modulator 224, and an OFDM modulator 226. For a more detailed discussion of a conventional orthogonal frequency division multiplexing (OFDM) system, see, for example, W.Y. Zou and Y. Wu, "COFDM—An Overview," IEEE Trans. Broadcasting, Vol. 41, No. 1, 1–8 (March 1995) or J. A. C. Bingham, "Multicarrier Modulation for Data Transmission: An Idea Whose Time Has Come," IEEE Comm., 5–14 (May 1990), each incorporated by reference herein.

Generally, the convolutional coding in coder 220 is an example of a type of "outer code" that may be used in the system 200. Other types of outer codes may also be used, including block or convolutional codes, so-called "turbo" codes, and coding associated with trellis coded modulation. The modulated output of the OFDM modulator 226, which corresponds to the digital side bands 102 and 104, is transmitted through an FM broadcast channel 230 to a receiver (not shown). The DQPSK modulator 224 processes the interleaved bit stream to generate one QPSK symbol for each two bits, which is then mapped to the appropriate sub-carrier by the OFDM modulator 226.

Figure 3:
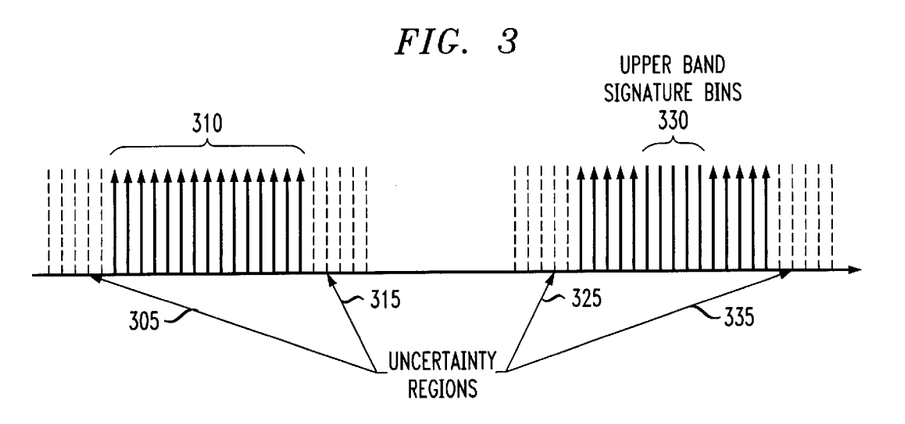
FIG. 3 illustrates the format of a signature OFDM frame in accordance with the present invention.

FIG. 3 illustrates the format of a signature OFDM frame in accordance with the present invention. It is noted that the n bins that carry the Barker sequence are referred to as the signature bins 310, 330 and the OFDM frames that contain the signature bins are referred to as signature frames. If the maximum frequency offset is M bin separations, then the frequency offset algorithm utilizes a search window of size n+2M bin separations, and attempts to maintain the Barker sequence in the center of the search window. As shown in FIG. 3, the present invention utilizes four uncertainty regions 305, 315, 325, 335 of size M, where M is the group of bins (sub-carriers) that can fall out of the receiver processing range for maximum positive and negative frequency offset values.

Coarse Frequency Offset Estimation

The coarse frequency offset estimation algorithm searches for some signature bins within a predefined maximum frequency offset of an expected set of bin locations. The disclosed frequency offset estimation algorithm provides for parallel partial and coarse frequency offset estimation in the frequency domain. The parallel partial and coarse frequency offset estimation algorithm disclosed herein provides fast acquisition and tracking of the incoming carrier in addition to further robustness against non-uniform interference.

Figure 4:
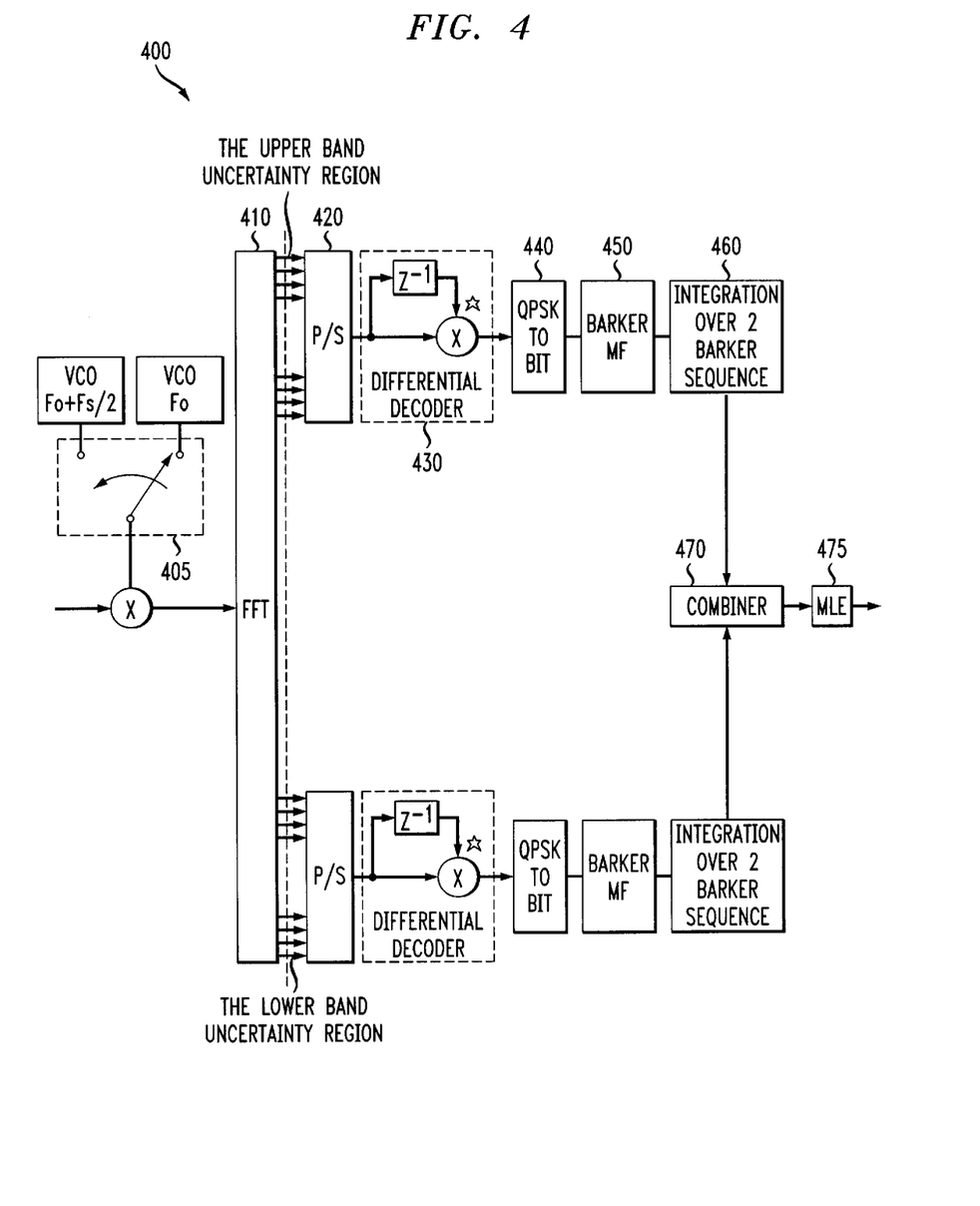
FIG. 4 is a schematic block diagram of an exemplary receiver in a hybrid in-band on-channel (HIBOC) digital audio broadcasting (DAB) system in which the coarse frequency offset estimation algorithm of the present invention may be implemented.

The system block diagram of a receiver 400 for the coarse frequency offset estimation algorithm is shown in FIG. 4. The coarse frequency offset estimation algorithm modulates seven consecutive sub-carriers (n=7) on each upper and lower side band of every OFDM frame by a 13-bit Barker signature sequence. The sequence is spread and repetitive over 7 consecutive frames so each of the DQPSK sub-carriers carries two bits of the Barker sequence, except the seventh symbol, which carries only one relevant bit. The algorithm searches for these sub-carriers within the uncertainty region (±M bins) of the original signature bins. By correlating seven consecutive bins carrying a 13 bit Barker sequence with the known signature sequence, the coarse frequency offset in terms of the number of OFDM sub-carriers can be readily estimated.

As no partial offset estimation is achieved prior to the coarse frequency offset estimation algorithm, severe inter-carrier interference is expected for significant fractional offset levels. In the worst case, with offset levels close to half the symbol rate, the coarse frequency offset may not be estimated as a result of very severe inter-carrier interference. To mitigate this problem, the correlation is observed against both the received signal and a frequency-shifted version of the received signal by half a symbol rate. Since the correlation is performed for two frequencies, with a relative offset of half of the inter-bin frequency amount, $\Delta f$, at least one frequency will position the correlated peak near a bin. In other words, the inter-carrier interference levels will be acceptable for at least one of the two frequency positions.

From locating the correlated peak over 3 correlation periods, for each frequency value (position of the switch 405 in FIG. 4), the receiver 400 can estimate the coarse frequency offset in terms of the number of shifted bins as shown in FIG. 4. The coarse frequency offset estimation algorithm also determines the switch position that will throw the signal frequency closer to the neighboring bin in the frequency domain.

The receiver 400 processes the outputs +N to N+n and −N to −N−n, of the FFT block 410, where the outputs +N to N+n correspond to the locations of the upper signature bins and the outputs −N−n to −N correspond to the locations of the lower signature bins in absence of any frequency offset. If the received frequency domain signal is shifted by a frequency offset equal to an integer multiple of the frame rate before the FFT operation, this frequency shift in the frequency domain is translated to a time shift by an integer number of symbols at the FFT output. In other words, the signal pattern at the output of the FFT block 410 will be shifted by $\pm \Delta n$ to the left or to the right depending on the sign of the frequency offset. As shown in FIG. 4, the receiver 400 also includes a parallel to serial converter 420, a differential decoder 430, a QPSK symbol to bit mapper 440, a Barker matched filter 450, a thresheld detector (integrates over two Barker sequences) 460 for identifying correlated peaks, and a combiner 470 and maximum detector (MLE) 475.

Figure 5:
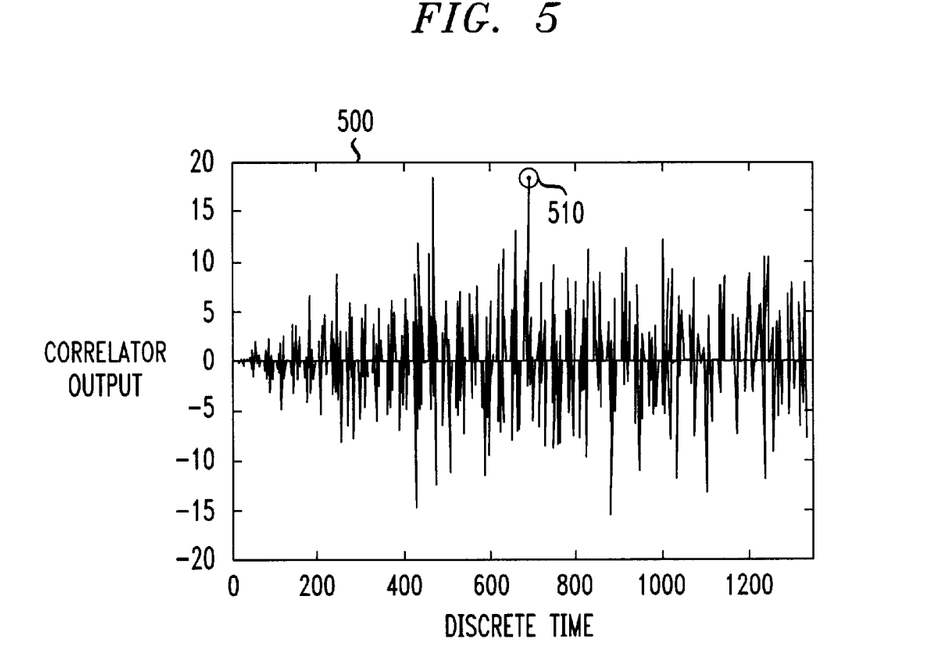
FIG. 5 illustrates the correlator output for a 100 Hz partial frequency offset in a system having a bin separation of 275 Hz.

FIG. 5 illustrates the correlator output 500 for a 100 Hz partial frequency offset. It is noted that the largest correlated peak 510 is achieved when the switch is in position one, corresponding to a shift of the received signal by half the symbol rate or 134 Hz, in the illustrative embodiment. Compared to the original 100 Hz offset, this partial offset will introduce lower inter-carrier interference and thus, a larger correlated peak is achieved at the correlator output.

Partial Frequency Offset Estimation Algorithm

To estimate and compensate for the partial frequency offset in the range of $+f_{fr}/2$ and $-f_{fr}/2$ (where $f_{fr}$ denotes the OFDM bin separation), the coarse frequency offset must have been already completed successfully, in the manner described above. In other words, the received signal must be synchronized to the local oscillator within the above-mentioned frequency range prior to initiation of the partial frequency tracking algorithm.

The unmodulated inner-most bins of each upper and lower side band in an OFDM system are used for receiver differential decoding of the DQPSK modulated signal. These pilots can be used for partial offset estimation as well. Following the coarse frequency offset estimation, the unmodulated bins, and all bins are within at least half the of the OFDM bin separation. The unmodulated bins can be used to estimate the partial fraction of the frequency offset. In the presence of a frequency offset, the complex bins start rotating. The rate of the rotation is a function of the extent of the frequency offset. The partial frequency offset estimation algorithm attempts to make the rate of rotation equal to zero. The change in phase from one frame to the next is proportional to the rate of rotation, and the sign of the rotation indicates the direction of the shift.

Figure 6:
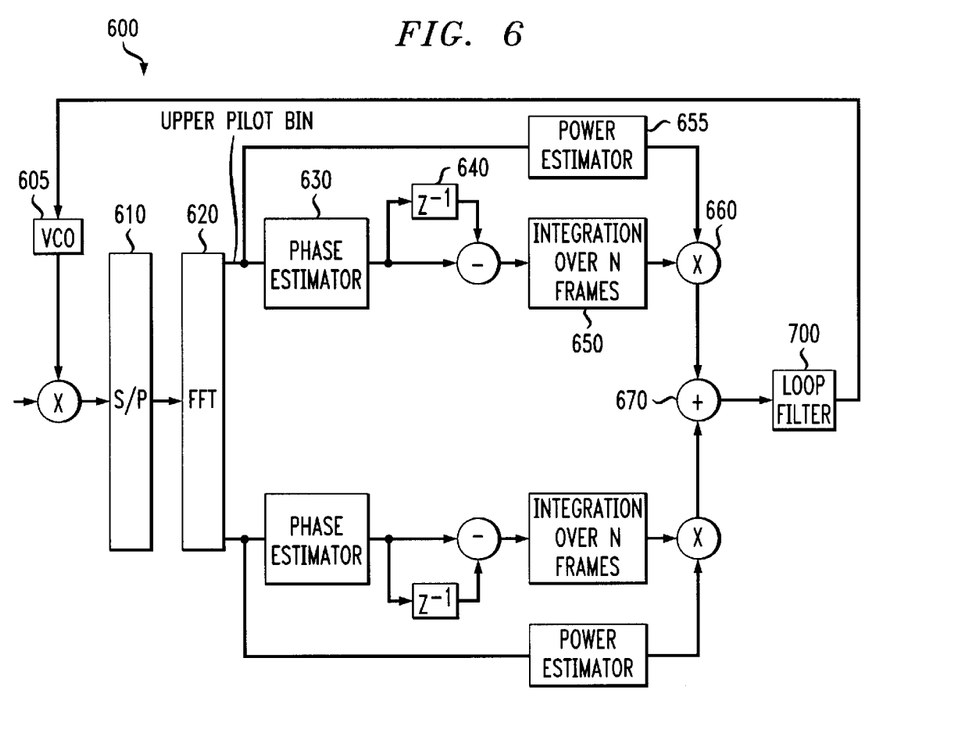
FIG. 6 is a schematic block diagram of an exemplary receiver in a hybrid in-band on-channel (HIBOC) digital audio broadcasting (DAB) system in which the partial frequency offset estimation algorithm of the present invention may be implemented.

The system block diagram of a receiver 600 for the partial frequency offset estimation algorithm is shown in FIG. 6. The phases of the outputs of the FFT 620 associated with the upper and lower pilot tones 103, 105 (the DQPSK reference symbols) are continuously estimated on a frame-to-frame basis and the bin rotation over each frame interval is estimated by a phase estimator 630, as shown in FIG. 6. As previously indicated, the change in phase from one frame to the next is proportional to the rate of rotation. The change in phase between two frames is obtained using a delay element 640, and then an integrator 650 is used over N frames to enhance the value, as discussed below. A multiplier 660 obtains the weight based on the relative power of the corresponding upper or lower pilot bins, and then an adder 670 combines the results from the upper or lower pilot bins.

With an inter-frame phase rotation of $\Delta\Theta$ and a frame rate of $f_{fr}$ the residual (partial) frequency offset can be estimated as follows:

$$\Delta f_{res} = \frac{\Delta\Theta \cdot f_{fr}}{2\pi}$$

The phase rotation estimation is hampered by inter-bin interference from the adjacent modulated bins, especially for large offset values. In order to reduce this effect, as well as the effect of the background noise and fading, integration is continuously performed over N consecutive $\Delta\Theta$ values by the integrator 650 prior to loop filtering. Furthermore, the two enhanced signals for both upper and lower sides are scaled and then combined in a maximum ratio combining fashion. This technique would reduce the impact of the channel selective fading on the two narrow-band pilot tones in a way that the stronger pilot has the dominant share in the frequency rotation estimation.

Figure 7:
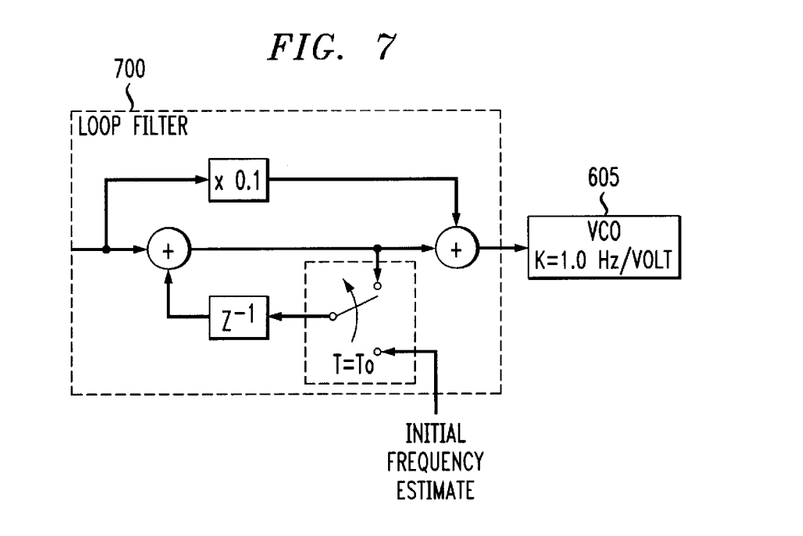
FIG. 7 illustrates the second order loop of FIG. 6 in further detail.

FIG. 7 illustrates the second order loop filter 700 of FIG. 6 in further detail. The second order loop filter 700 may be embodied, for example, as a well-known lead-lag filter used in second order phase locked loops. In one implementation, the second order loop filter 700 consists of a unit gain pure integrator plus a proportion branch with the gain 0.10500. The loop gain is determined by the given loop filter parameters as well as the VCO gain of 0.8032 Hz/Volt. These numbers were selected to fit fixed-point precision. In order to accelerate the frequency acquisition process, the VCO is initialized with coarse partial frequency offset estimation which have been measured by the pilot phase rotations over the first 3 OFDM frames. This technique can cut the frequency acquisition in the worse case scenario (70 Hz partial offset) to less than 7 frames, which could have been as long as 20 frames in the absence of the proposed VCO initialization.

It is to be understood that the embodiments and variations shown and described herein are merely illustrative of the principles of this invention and that various modifications may be implemented by those skilled in the art without departing from the scope and spirit of the invention.

We claim:

1. A method for coarse frequency offset estimation in an OFDM communication system, comprising the steps of:
   receiving a digital signal containing a signature sequence;
   correlating said received digital signal using at least two frequencies; and
   selecting one of said frequencies that provides a correlated peak having the largest magnitude to position said correlated peak near a bin.

2. The method of claim 1, further comprising the step of estimating the coarse frequency offset by determining whether a correlated peak associated with said signature sequence is in an expected location.

3. The method of claim 1, wherein said signature sequence is a Barker code.

4. The method of claim 1, wherein said signature sequence provides reference information contained in discrete known frequency points in the frequency domain.

5. The method of claim 1, further comprising the step of applying a calculated coarse frequency offset to a forward correction mechanism.

6. The method of claim 1, further comprising the step of applying a calculated coarse frequency offset to a feedback mechanism.

7. A method for estimating the partial frequency offset in an OFDM communication system, comprising the steps of:
   estimating a coarse frequency offset to position a correlated peak associated with a signature sequence near an OFDM bin within a predefined distance of an OFDM bin separation;
   evaluating a change in phase of an unmodulated bin over at least two frames; and
   estimating the partial frequency offset based on said change in phase.

8. The method of claim 7, wherein said coarse frequency offset estimation positions said correlated peak half of an OFDM bin separation.

9. The method of claim 7, further comprising the steps of extracting and filtering said partial frequency offset in the time domain.

10. The method of claim 7, further comprising the step of correcting and using said partial frequency offset estimate for continuous frequency tracking.

11. The method of claim 7, wherein the extent of the frequency offset is a function of a rate of rotation of said change in phase.

12. The method of claim 7, further comprising the step of making said rate of rotation equal to zero.

13. The method of claim 7, wherein a polarity of a rate of rotation of said change in phase indicates the direction of a frequency offset.

14. A receiver for receiving a digital signal containing a signature sequence in an OFDM communication system, comprising:
 a filter matched to said signature sequence for correlating said received digital signal using at least two frequencies; and
 means for selecting one of said frequencies that provides a correlated peak having the largest magnitude to position said correlated peak near a bin.

15. The receiver of claim 14, further comprising means for estimating the coarse frequency offset by determining whether a correlated peak associated with said signature sequence is in an expected location.

16. The receiver of claim 14, wherein said signature sequence is a Barker code.

17. The receiver of claim 14, wherein said signature sequence provides reference information contained in discrete known frequency points in the frequency domain.

18. The receiver of claim 14, further comprising a forward correction mechanism for compensating for a calculated coarse frequency offset.

19. The receiver of claim 14, further comprising a feedback mechanism for compensating for a calculated coarse frequency offset.

20. A receiver in an OFDM communication system, comprising:
 a coarse frequency offset estimator to position a correlated peak associated with a signature sequence near an OFDM bin within a predefined distance of an OFDM bin separation;
 a phase estimator for evaluating a change in phase of an unmodulated bin over at least two frames; and
 means for estimating a partial frequency offset based on said change in phase.

21. The receiver of claim 20, wherein said coarse frequency offset estimator positions said correlated peak half of an OFDM bin separation.

22. The receiver of claim 20, further comprising a loop filter for extracting and filtering said partial frequency offset in the time domain.

23. The receiver of claim 20, wherein the extent of the frequency offset is a function of a rate of rotation of said change in phase.

24. The receiver of claim 20, further comprising a feedback loop to make said rate of rotation equal to zero.

25. The receiver of claim 20, wherein a polarity of a rate of rotation of said change in phase indicates the direction of a frequency offset.

26. The receiver of claim 20, wherein the partial frequency offset is estimated as follows:

$$\Delta f_{res} = \frac{\Delta \Theta \cdot f_{fr}}{2\pi},$$

where $\Delta f_{res}$ is the partial frequency offset $\Delta \Theta$ is the interframe phase rotation and $f_{fr}$ is the frame rate.

* * * * *

UNITED STATES PATENT AND TRADEMARK OFFICE
CERTIFICATE OF CORRECTION

PATENT NO.   : 6,807,241 B1
DATED         : October 19, 2004
INVENTOR(S)  : Milbar et al.

It is certified that error appears in the above-identified patent and that said Letters Patent is hereby corrected as shown below:

<u>Title page, Item [54] and Column 1, line 2,</u>
Title, before "FREQUENCY" and after "AND" replace "COURSE" with -- COARSE --.

<u>Column 3,</u>
Line 12, before "of" and after "half" delete "the".

<u>Column 9,</u>
Line 11, before "rate" and after "making" replace "said" with -- a --.

Signed and Sealed this

Twenty-first Day of March, 2006

JON W. DUDAS
*Director of the United States Patent and Trademark Office*